United States Patent [19]
Gouzman et al.

[11] Patent Number: 5,912,660
[45] Date of Patent: Jun. 15, 1999

[54] MOUSE-LIKE INPUT/OUTPUT DEVICE WITH DISPLAY SCREEN AND METHOD FOR ITS USE

[75] Inventors: Roman Gouzman; Igor Karasin, both of Jerusalem; Dmitri Rozenblum, Maaleh Adumim, all of Israel

[73] Assignee: Virtouch Ltd., Jerusalem, Israel

[21] Appl. No.: 08/781,017

[22] Filed: Jan. 9, 1997

[51] Int. Cl.$^6$ .............................. G06F 3/033; G09G 5/00
[52] U.S. Cl. ........................... 345/163; 434/114; 463/30; 340/825.19
[58] Field of Search ................................ 345/163–166; 434/112, 114, 117; 340/825.19, 407.2; 463/30

[56] References Cited

U.S. PATENT DOCUMENTS

| | | |
|---|---|---|
| 3,594,787 | 7/1971 | Ickes . |
| 3,768,180 | 10/1973 | Arrdal . |
| 4,772,205 | 9/1988 | Chlumsky et al. . |
| 4,875,185 | 10/1989 | Bornschein . |
| 4,881,900 | 11/1989 | Matsuoka et al. . |
| 4,898,536 | 2/1990 | Hoffarth . |
| 5,186,629 | 2/1993 | Rohen . |
| 5,195,894 | 3/1993 | le Blanc et al. . |
| 5,222,895 | 6/1993 | Fricke . |
| 5,244,288 | 9/1993 | Nagaoka et al. . |
| 5,374,924 | 12/1994 | McKiel, Jr. . |
| 5,496,174 | 3/1996 | Garner . |
| 5,512,920 | 4/1996 | Gibson .................................... 345/163 |
| 5,563,631 | 10/1996 | Masunaga ............................... 345/163 |
| 5,736,978 | 4/1998 | Hasser et al. .......................... 345/173 |

OTHER PUBLICATIONS

F.H. Papenheimer, brochure for "Braillex–1B 80", no further information.
Baum Prod. Gmb., advertisement for "INKA", no further information.
TeleSensory, brochure for "PowerBraille 40", no further information.
TeleSensory, brochure for "BrailleMate", no further information.

*Primary Examiner*—Jeffery Brier
*Attorney, Agent, or Firm*—Hedman, Gibson & Costigan, P.C.

[57] ABSTRACT

A computer mouse for blind users and a method for its use. The mouse has a display area on its upper surface in which a portion of the computer's screen display is reproduced in tactile form, for example by raising and lowering members of an array of pins. A monochrome display is encoded by pin height. A color display may be encoded in various ways. Preferably, lightness is encoded as the range of vertical motion of the pins and hue is encoded as pin motion frequency. A blind user scans the screen display by moving the mouse around on a mouse pad and feeling the relative heights and frequencies of the pins.

13 Claims, 4 Drawing Sheets

MOUSE-LIKE INPUT/OUTPUT DEVICE WITH DISPLAY SCREEN AND METHOD FOR ITS USE

FIELD AND BACKGROUND OF THE INVENTION

The present invention relates to computer input/output devices and, more particularly, to a mouse-like device, with an integrated display screen, that expands the input/output options available to the user. In particular, the device makes it easier for a blind person to use a computer.

Most interactions between users and computers are mediated by a visual display, on the display screen of a monitor, of information such as text and graphics. This interaction mode is obviously not suitable for blind or vision-impaired users. A variety of interface devices are available that translate lines of text to Braille, for example the Power-Braille 40 of TeleSensory, Mountain View CA, and the INKA keyboard of Baum Products GmbH, Wiesenbach, Germany. These devices suffer from the limitations that only text is translated, and only one line of text at a time is displayed. The DMD 120060 dot matrix display of Metec, Stuttgart, Germany, translates the entire visual display into a form that can be read by touch. Text is translated into Braille, and graphical information is translated into corresponding patterns of raised and lowered pins. This full-screen display does both too much and too little. It does too much in the sense that, unlike a sighted user, who perceives the entire visual display at once, a blind user touches only a small part of the display at any given time, and reconstructs the whole display from a sequence of such partial touches. Therefore, it is not necessary to translate the entire visual display into tactile form all at once. It does too little in the sense that it may take up to 20 seconds or longer to refresh the display if most or all of the pins must be moved.

Another limitation on the access of blind and visually impaired users to computers is that there is no known device that enables a blind or visually impaired user to draw directly on a screen display, and obtain direct feedback on the accuracy of the drawing.

There is thus a widely recognized need for, and it would be highly advantageous to have, a tactile computer interface that enables a blind or visually impaired user to interact with a computer with more efficiency and flexibility than presently known interfaces.

SUMMARY OF THE INVENTION

According to the present invention there is provided a computer interface device for communicating with a computer having access to data displayable on a screen display, comprising: (a) a rigid housing having a first surface and a second surface; (b) a mechanism for sensing: (i) a position of the device relative to an initial position on a planar surface adjacent to the second surface and (ii) an orientation of the device relative to an initial orientation on the planar surface; (c) a display area, on the first surface, within which a portion of the data is displayed; and (d) a display mechanism for displaying the data in the display area.

According to the present invention there is provided a method for communicating with a computer having a screen display, comprising the steps of: (a) providing at least one planar surface; (b) providing at least one interface device including: (i) a rigid housing having a first surface and a second surface, (ii) a mechanism for sensing a position of the device relative to one of the at least one planar surface and an orientation of the device relative to the one of the at least one planar surface when the second surface is adjacent to the one of the at least one planar surface, (iii) a display area, on the first surface, and (iv) a tactile display mechanism for reproducing a portion of the screen display in the display area; and (c) reproducing the portion of the screen display in the display area.

The point of innovation of the present invention is the display of data on one surface of a computer mouse. This surface is referred to herein as the "upper" surface, because the display area of the present invention is most conveniently positioned on the side of the mouse farthest from the planar surface on which the mouse rests when in use; but the scope of the invention includes placement of the display area on another surface of the mouse, for example, a side surface. Similarly, the surface of the mouse that is adjacent to the planar surface while the mouse is in use is referred to herein as the "lower" surface. The display area includes a display mechanism, such as a small video screen or the tactile display device discussed below, that is built integrally into the mouse. The data being displayed may be displayed simultaneously on the display screen of a computer monitor, or may reside elsewhere, for example in the memory of the computer.

The present invention allows a user to obtain direct feedback, on the upper surface of the mouse itself, relating to the changes he or she makes in the mouse display as he or she moves the mouse. This is psychologically advantageous in computerized artistry: a graphics artist draws with the mouse and sees the results as he or she draws, just as he or she sees the results of drawing on a piece of paper with a pencil.

Furthermore, the present invention allows the display of data, stored in the computer, that is not displayed simultaneously on the screen, or data in the screen display in a different form. For example, text may be displayed on the screen in one language, and a translation of the text to a different language may be displayed on the mouse. Nevertheless, the focus of the description herein is on echoing a portion of the screen display on the upper surface of the mouse.

Although the scope of the present invention includes all such displays, including visual displays, the focus of the present invention is the provision of a tactile display that enables a blind user to feel a tactile representation of data being displayed visually on the screen, just as a sighted user can see that information. The blind user accesses different parts of the screen display by moving the mouse around on a planar surface, just as a sighted user accesses different parts of the screen display with a cursor by moving the mouse around on a planar surface. The user may feel the information by sliding his or her fingertips across the tactile display, as is done with the presently known devices. Alternatively, the user can rest his or her fingertips in one position on the tactile display while moving the mouse, thereby feeling the changes in the contours of the tactile display as the mouse is moved. Furthermore, a blind user may change (for example, draw on) the screen display in the conventional manner, just as a sighted user changes the screen display, for example by pressing a button on the mouse, and then feel the resulting change, just as a sighted user sees the resulting change.

One important difference between the mouse of the present invention and conventional computer mice is that the mouse of the present invention must be capable of sensing both its lateral position and its angular orientation on the planar surface, so that the portion of the screen display presented to the user always is oriented in the same way, for example, with the top part of the portion of the screen display away from the user and the bottom part of the portion of the screen display towards the user, no matter how the mouse is turned. One way of doing this is by providing the mouse with two or more trackballs. The angular orientation of the mouse may be inferred readily from the positions of the trackballs. Another way of doing this is by providing the mouse with a magnetic orientation sensor such as a compass.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is of a computer mouse provided with a tactile display area, on its upper surface, in which a portion of a screen display can be reproduced. The present invention can be used by blind and visually impaired users to interact with a computer.

The principles and operation of a computer mouse according to the present invention may be better understood with reference to the drawings and the accompanying description.

Figure 1A:
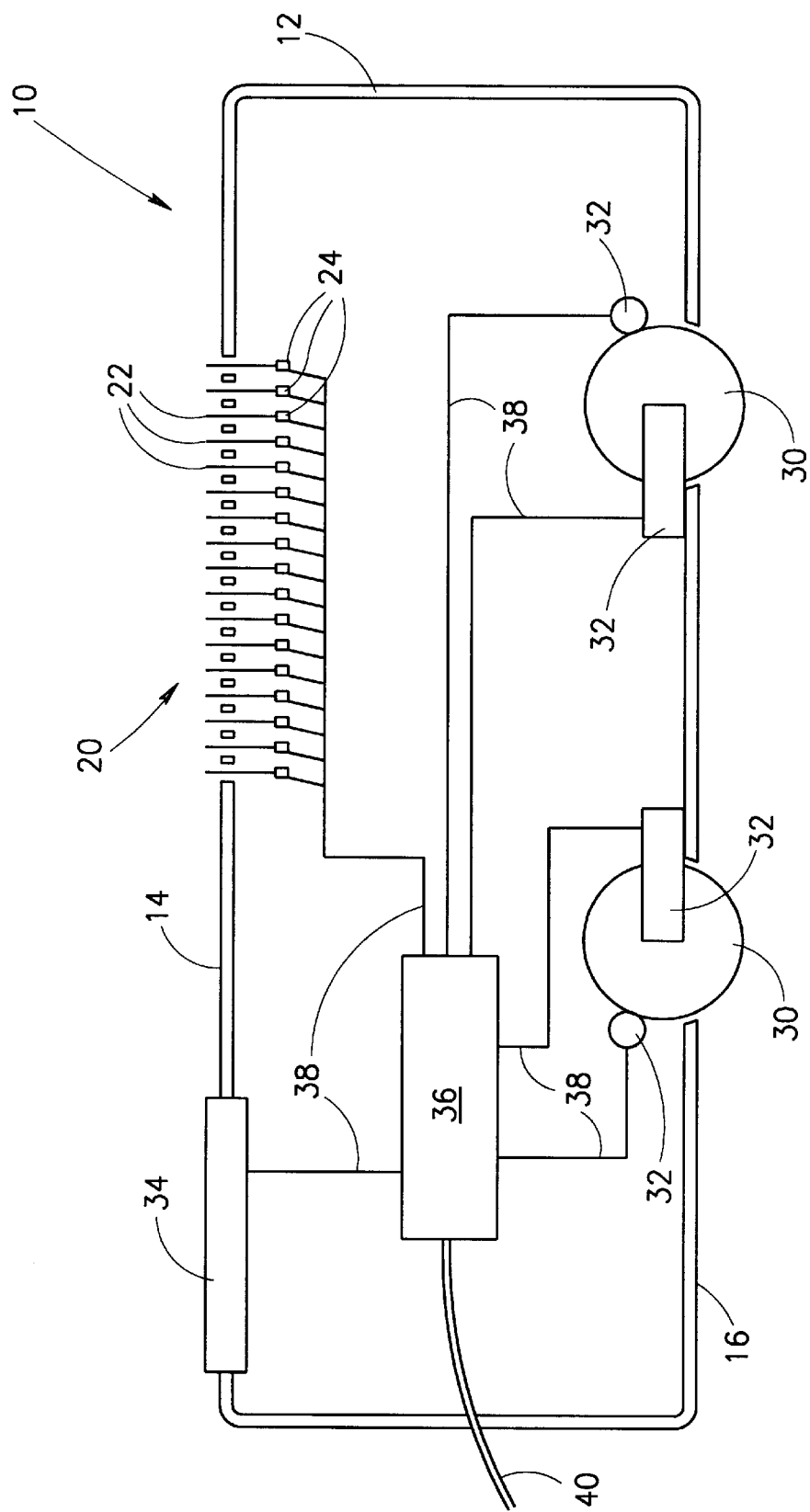
FIG. 1A is a schematic cross section through an embodiment of a mouse according to the present invention.

Referring now to the drawings, FIG. 1A is a schematic cross section through one embodiment 10 of the mouse of the present invention. A rigid housing 12 has an upper surface 14 and a lower surface 16. A display area 20 in upper surface 14 has a plurality of holes through which protrude a plurality of pins, some of which are designated by reference numeral 22. Pins 22 are moved up and down through the holes in display area 20 by actuators, some of which are designated by reference numeral 24, one actuator per pin. Protruding through holes in lower surface 16 are two balls 30, preferably made of rubber-covered steel. In contact with balls 30 are transducers 32, two orthogonally positioned transducers 32 for each ball 30. Transducers 32 are rotationally coupled to balls 30, in the sense that the rotation of ball 30 causes a portion (for example, an encoder wheel shaft) of one or both transducers 32 that are in contact with ball 30 to rotate, enabling transducers 32 to translate that rotation into electrical signals. Upper surface 14 is also provided with one or more buttons 34 in the conventional manner. Actuators 24, transducers 32 and button 34 are connected to conventional electronic circuitry 36 by electrical connectors 38. Circuitry 36 is connected to the host computer via a cord 40. The manner in which signals from button 34 and transducers 32 are relayed to the computer, and in which signals representative of a portion of the screen display of the computer are relayed to actuators 24 to move pins 20 up and down to reproduce that portion of the screen display, are well-known in the art and will not be elaborated herein.

Figure 1B:
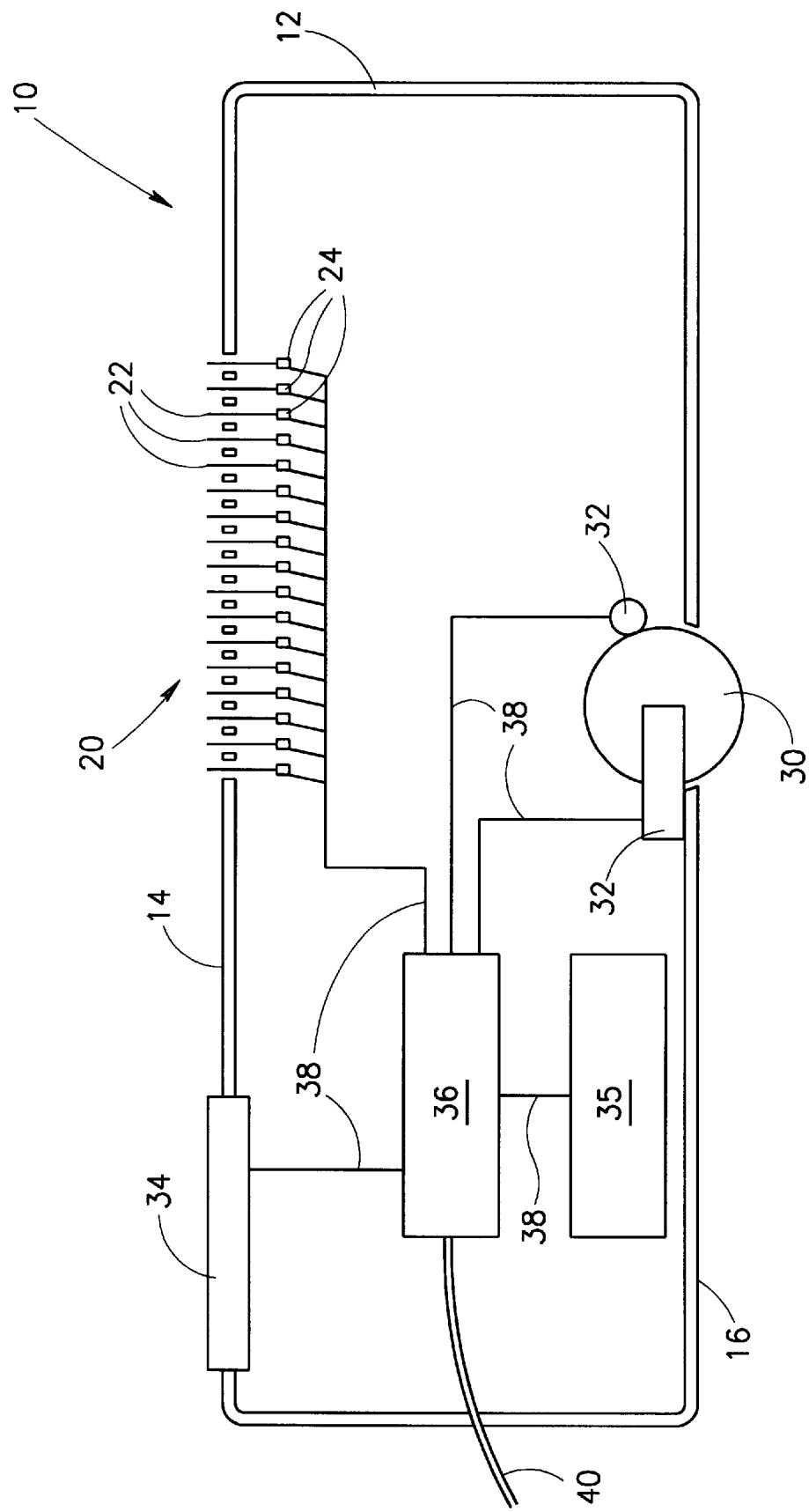
FIG. 1B is a schematic cross section through another embodiment of a mouse according to the present invention.

FIG. 1B is a schematic cross section through another embodiment 10' of the mouse of the present invention. Mouse 10' is substantially identical to mouse 10, except that instead of two balls 30, that are used to sense both position and orientation, as described below, mouse 10' has one ball 30', that is used to sense position only, in the conventional manner, and an independent orientation sensor 35. Orientation sensor 35 may be, for example, a magnetic sensor or a gyroscopic sensor.

Figure 2:
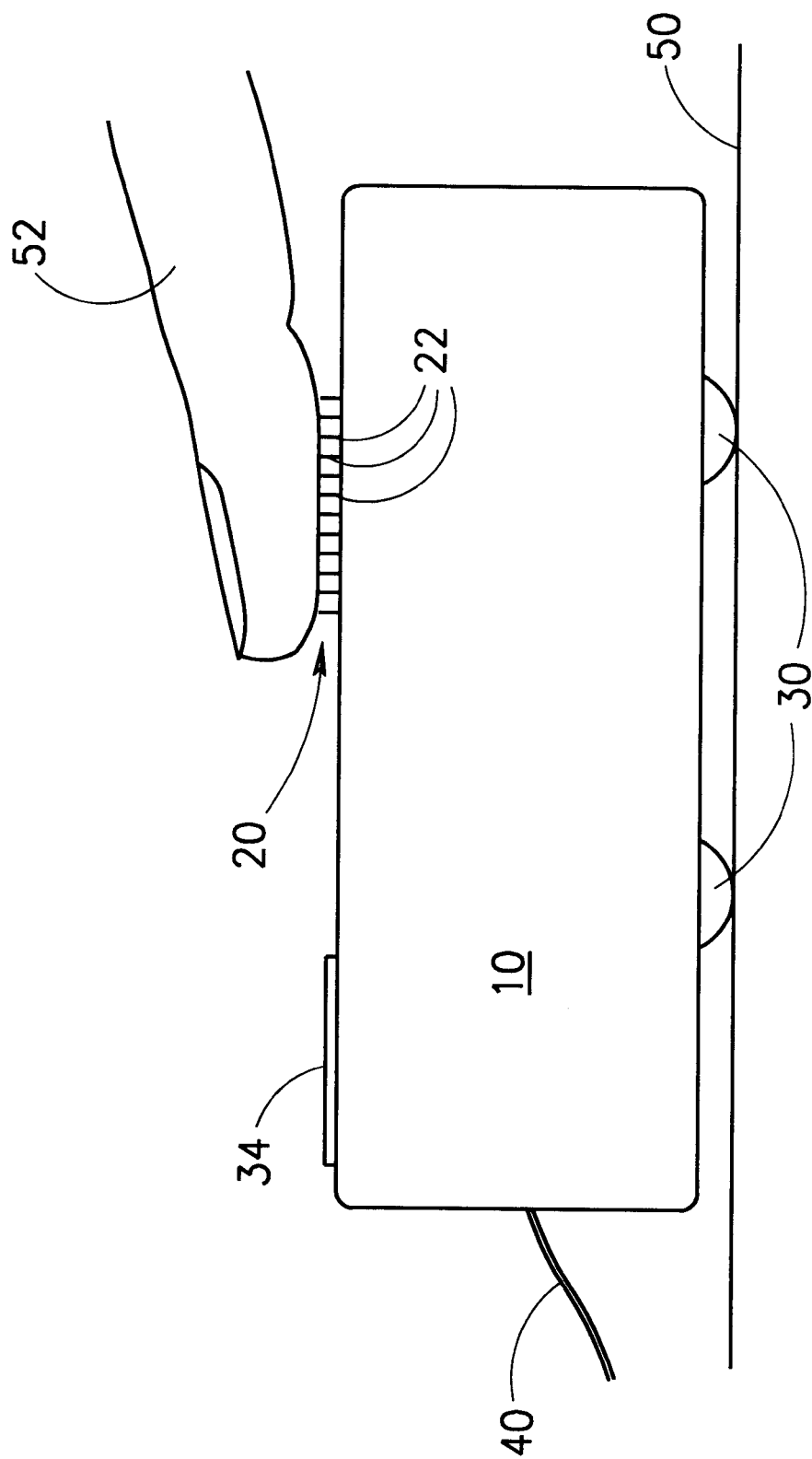
FIG. 2 is a side view of the mouse of FIG. 1A in use.
Figure 3A:
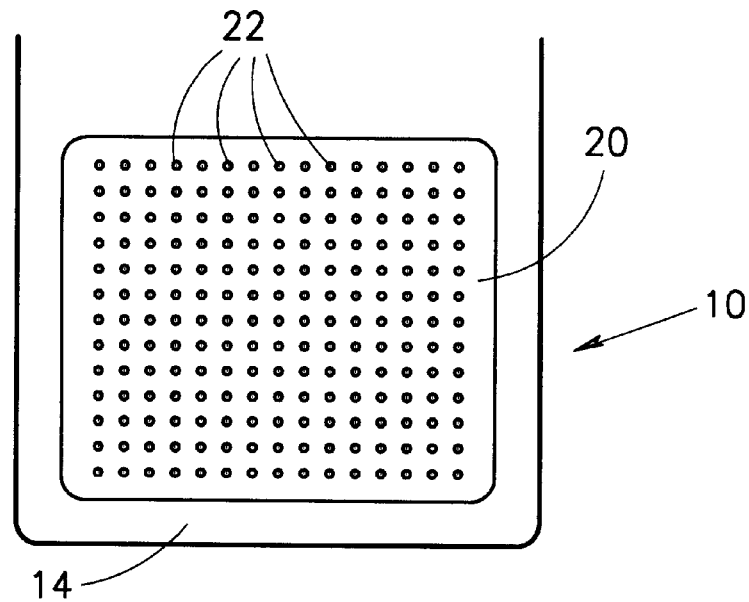
FIG. 3A is a partial top view of the mouse of FIG. 1A, showing the display area.
Figure 3B:
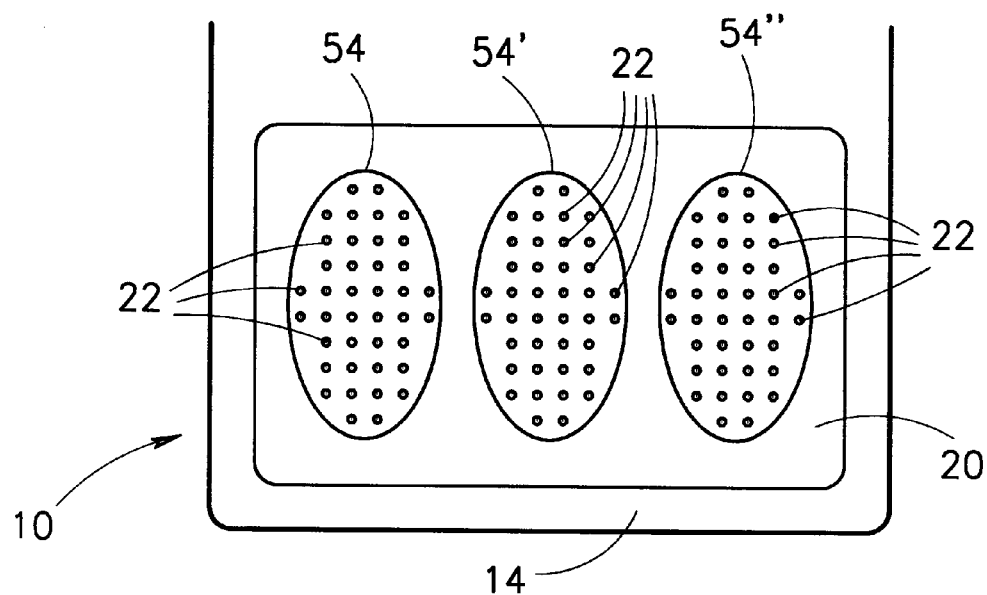
FIG. 3B is a partial top view of the mouse of FIG. 1A, showing an alternative embodiment of the display area.

FIG. 2 is a side view of mouse 10 in use. Mouse 10 rests on a planar surface 50, for example, a conventional mouse pad. A user places one or more fingertips 52 on display area 20 and moves mouse 10 around on surface 50 in the conventional manner. The position and orientation of mouse 10 on surface 50 is sensed by transducers 32 in response to the rotation of balls 30 and transmitted to the host computer via cord 40. The host computer transmits data representative of a portion of the computer's screen display, corresponding to the position of mouse 10 on surface 50, back to mouse 10 via cord 40. Pins 22 are moved up and down in accordance with those data, to provide a tactile representation of the data that is felt by the user via fingertip 52. FIGS. 3A and 3B are partial top views of mouse 10. FIG. 3A shows an embodiment of display area 20 in which pins 22 protrude through a rectangular array of holes. This array is illustrative; the present invention includes all suitable array geometries, for example hexagonal. FIG. 3B shows an embodiment of display area 20 in which the holes through which pins 22 protrude are confined to three fingertip-shaped and fingertip-sized subdisplay areas 54, 54' and 54".

As noted above, the orientation of mouse 10 on surface 50 is inferred from the relative positions of balls 30 on surface 50. Let $x_2$ and $Y_2$ be the x-coordinate and y-coordinate, respectively, of ball 30 which is closer to cord 40, and let x1 $y_1$ be the x-coordinate and y-coordinate, respectively, of ball 30 which is farther from cord 40. Let $\Delta x = x_2 - x_1$ and $\Delta y = Y_2 - y_1$. Let an orientation of 0° correspond to $\Delta x = 0$ and $\Delta y$ positive. The orientation angle of mouse 10 then is arctan ($\Delta x/\Delta y$). For example, if $\Delta x = \Delta y$, mouse 10 is rotated 45° counterclockwise from the position in which $\Delta x$ is zero and $\Delta y$ is positive.

Just as the correspondence between the position of a cursor on a display screen and the lateral position of a conventional mouse on a mouse pad tends to drift with use, so the correspondence between the orientation of a screen display and the orientation of mouse 10 on surface 50 tends to drift. Therefore, the orientation of mouse 10 must be re-initialized occasionally at a standard orientation, for example, 0°. This is done by orienting mouse 10 on surface 50 at the physical angle that is to correspond to the standard orientation, and entering the appropriate command to the computer via the computer keyboard and/or buttons 34. The stability of the correspondence between the orientation of the screen display and the orientation of the mouse of the present invention can be enhanced by providing the mouse with more than two balls 30, because of the redundancy that this provides to the angle calculation.

A fiducial point in display area 20 functions as a tactile equivalent of the screen cursor of a conventional visual display. This fiducial point may be any uniquely identifiable point in display area 20, for example, one of the corners of a square display area such as display area 20 of FIG. 3A, the center point of display area 20 of FIG. 3A, or the center point of subdisplay area 54' of FIG. 3B. Just as pressing a button of a conventional mouse is used to initiate an activity related to the position of a screen cursor, so pressing button 34 is used to initiate an activity related to the location in the screen display that corresponds to the location of the fiducial point relative to the portion of the screen display being represented in display area 20. For example, pressing button 34 may be used to initiate the drawing of a line starting from the point on the screen display that corresponds to the fiducial point. The user can monitor the progress and accuracy of such activities by feeling the consequences in display area 20, just as a sighted user can see the consequences of his or her actions on the screen display.

One challenge in the translation of a visual display to a tactile display in display area 20 is that the density of information that can be perceived visually is greater than the density of information that can be perceived tactually. This is not a problem in the tactile representation of text, which is easily translated to Braille. This is also not a serious problem in the translation of a monochrome display, because one color, for example the dimmer of the two colors, can be represented by a pin-up position and the other color, for example the brighter of the two colors, can be represented by a pin-down position. The true challenge is in the rendering of a color display in tactile form. The colors of color displays have three attributes (hue, lightness and saturation) and it is difficult to encode all three in a tactile display. The approach used to translate a monochrome display can be applied to color displays with strong lightness contrasts but can not be used generally. The preferred approach of the present invention is to encode hue as frequency of up-and-down motion of the pins, preferably in the range of between 3 Hz and 5 Hz, which is adequate for the encoding of four hues, while encoding lightness as the range of motion of the pins, and ignoring saturation. Of course, the choice of which attribute is displayed and which is ignored can be placed under user control, so that, for example, a user may choose to encode saturation as frequency and ignore hue.

It will be appreciated that a blind or vision-impaired user is not limited to using only one mouse of the present invention. Just as a blind person often reads Braille using both of his or her hands, so a blind user can use two mice, one with each hand, to peruse two different parts of a screen display at once. For that matter, two sighted users may use two mice of the present invention to play a nonvisual computer game. A sighted user also may use one mouse of the present invention to enable him or her to monitor two displays simultaneously, one visually and the other tactually. In addition, a sighted user may use a mouse of the present invention to enhance his or her perception of a wrap-around display, for example a display of a planetary map, in which the left side of the screen is adjacent in data space to the right side of the screen.

It also will be appreciated that the geometric correspondence between the screen display and the tactile display may be varied to suit different applications. In particular, the size of the portion of the screen reproduced in display area 20 may be varied. The simplest correspondence between the screen display and the tactile display is one pixel per pin 22; but other correspondences are within the scope of the present invention. For example, resolution may be increased by having more than one pin 22 correspond to one pixel, and resolution may be decreased by having more than one pixel correspond to one pin 22. In addition, the aspect ratio of display area 20 need not be the same as the aspect ratio of the screen. So, for example, one pin 22 may correspond to one pixel interval horizontally and two pixel intervals vertically.

While the invention has been described with respect to a limited number of embodiments, it will be appreciated that many variations, modifications and other applications of the invention may be made.

What is claimed is:

1. A computer interface device for communicating with a computer having access to data displayable visually on a computer screen display employing a cursor, including:

(a) a rigid housing having a first surface and a second surface;

(b) a tactile display arranged on said first surface, having at least one array of selectably movable tactile pins, representative of at least one selected portion of the screen display, wherein said array includes a fiducial point representative of the cursor;

(c) a mechanism for sensing a position of the device relative to an initial position on a planar surface adjacent to said second surface, along which said device is moved, and an orientation of the device relative to an initial orientation on said planar surface;

(d) a pressable button for initiating an activity related to a location in the screen display that corresponds to the location of said fiducial point relative to said selected portion of the screen display represented by said tactile display; and (e) electronic circuitry for providing the sensed position and orientation to the computer, for receiving from the computer signals corresponding to data stored in the computer, and for moving said tactile pins in a predetermined manner so as to display the stored data.

2. A device according to claim 1, wherein said electronic circuitry is operative to receive from the computer signals corresponding to data displayed on the screen, and to move said tactile pins so as to display the displayed data.

3. A device according to claim 1, wherein said electronic circuitry is operative to receive from the computer signals corresponding to data stored in the computer but not displayed on the screen, and to move said tactile pins so as to display the stored data.

4. A device according to claim 3, wherein each said array is a two dimensional array having 40 pins.

5. A device according to claim 4, wherein each said array has size and shape configured for tactile engagement by the tip of a finger of a user.

6. A device according to claim 5, wherein each said array is operative to represent a selected screen portion at a preselected resolution.

7. A device according to claim 6, wherein said resolution is at least one pin of said at least one array per pixel of the computer screen.

8. A device according to claim 5, wherein each said array is operative to represent a selected screen portion at a preselected aspect ratio.

9. A device according to claim 1, wherein said electronic circuitry is operative, when said tactile display is displaying an image corresponding to a monochrome image displayed on the computer screen, to represent respectively darker and lighter shades by different predetermined respective displacements of said pins.

10. A device according to claim 1, wherein said electronic circuitry is operative, when said tactile display is displaying an image corresponding to a color image displayed on the computer screen, to move said pins in different predetermined modes so as to display at least two of the group which consists of:

hue, lightness, and saturation.

11. The device of claim 1, wherein said sensing mechanism includes:

a pair of rotatable balls located within said housing; and for each said rotatable ball, two transducers rotationally coupled thereto, wherein rotation of said ball in either if two orthogonal directions is detected, thereby providing an indication of movement of said ball relative to the planar surface.

12. The device of claim 1, wherein said sensing mechanism includes an orientation sensor.

13. The device of claim 12, wherein said orientation sensor is selected from the group consisting of magnetic sensors and gyroscopic sensors.

* * * * *